United States Patent

Perman et al.

[11] Patent Number: 5,670,102
[45] Date of Patent: Sep. 23, 1997

[54] METHOD OF MAKING THERMOPLASTIC FOAMED ARTICLES USING SUPERCRITICAL FLUID

[75] Inventors: Craig A. Perman, Woodbury, Minn.; William A. Hendrickson, Houlton, Wis.; Manfred E. Riechert, Maplewood, Minn.

[73] Assignee: Minnesota Mining and Manufacturing Company, St. Paul, Minn.

[21] Appl. No.: 181,696

[22] Filed: Jan. 25, 1994

Related U.S. Application Data

[63] Continuation-in-part of Ser. No. 16,602, Feb. 11, 1993, abandoned.

[51] Int. Cl.$^6$ .................................................. B29C 44/02
[52] U.S. Cl. .................................. 264/50; 264/51; 264/53
[58] Field of Search .............................. 264/50, 51, 53

[56] References Cited

U.S. PATENT DOCUMENTS

| | | | |
|---|---|---|---|
| 2,751,627 | 6/1956 | Lindemann | 18/48 |
| 3,140,266 | 7/1964 | Peticolas | 260/2.5 |
| 3,227,664 | 1/1966 | Blades et al. | 260/2.5 |
| 3,298,975 | 1/1967 | Felid et al. | 260/2.5 |
| 3,342,760 | 9/1967 | Rode et al. | 260/2.5 |
| 3,542,715 | 11/1970 | White et al. | 260/2.5 |
| 3,681,270 | 8/1972 | Fuchs | 260/2.5 |
| 3,770,663 | 11/1973 | Ueki et al. | 260/2.5 |
| 3,812,062 | 5/1974 | Tatzel et al. | 260/2.5 |
| 3,856,717 | 12/1974 | Theard et al. | 260/2.5 |
| 3,912,800 | 10/1975 | Edlin et al. | 264/53 |
| 3,959,197 | 5/1976 | Salyer et al. | 260/2.5 |
| 3,988,404 | 10/1976 | Orimo et al. | 264/45.9 |
| 4,464,484 | 8/1984 | Yoshimura et al. | 521/58 |
| 4,473,665 | 9/1984 | Martini-Vvedensky et al. | 521/79 |
| 4,532,094 | 7/1985 | Wu et al. | 264/53 |
| 4,532,263 | 7/1985 | Krutchen et al. | 264/53 |
| 4,535,100 | 8/1985 | Krutchen et al. | 264/321 |
| 4,594,207 | 6/1986 | Josefiak et al. | 264/41 |
| 4,704,239 | 11/1987 | Yoshimura et al. | 264/50 |
| 4,761,256 | 8/1988 | Hardenbrook et al. | 264/45.5 |
| 4,873,218 | 10/1989 | Pokala | 502/418 |
| 4,906,672 | 3/1990 | Stone et al. | 521/130 |
| 5,049,328 | 9/1991 | Meyer et al. | 264/50 |
| 5,128,382 | 7/1992 | Elliott, Jr. et al. | 521/178 |
| 5,133,913 | 7/1992 | Miyakawa et al. | 264/50 |
| 5,158,986 | 10/1992 | Cha et al. | 521/82 |
| 5,271,886 | 12/1993 | Collom et al. | 264/50 |

FOREIGN PATENT DOCUMENTS

1 220 053  1/1971  United Kingdom .

OTHER PUBLICATIONS

"Thermal Conductivity of Monolithic Organic Aerogels", Science, vol. 255, Feb. 21, 1992, pp. 971–972 X. Lu et al.

"High Pressure Gas Chromatography of Nonvolatile Species", Science, vol. 162, Oct. 4, 1968, pp. 67–73, Giddings et al.

"Standard Test Method for Vicat Softening Temperature of Plastics[1]", ASTM Designation: D 1525 –91, pp. 461–463 (undated).

"Silver & Silver Alloys To Sulfolanes & Sulfones", Kirk–Othmer Encyclopedia of Chemical Technology, 3rd Ed., vol. 21, pp. 377, 386 and 387 (1983).

"Alcohol Fuels to Toxicology", Kirk–Othmer Encyclopedia of Chemical Technology, 3rd Ed., Supplement vol., pp. 872–891 (1984).

(List continued on next page.)

Primary Examiner—Allan R. Kuhns
Attorney, Agent, or Firm—Gary L. Griswold; Walter N. Kirn; Carolyn V. Peters

[57] ABSTRACT

Foamed thermoplastic articles, both filled and unfilled foamed articles have a foamed density of greater than 0.03 grams per cubic centimeters ($g/cm^3$), cell sizes in the range of 10 to 300 micrometers ($\mu m$) with cell wall thicknesses of greater than 0.1 $\mu m$ but less than 2 $\mu m$ and a process for making the same.

14 Claims, 9 Drawing Sheets

OTHER PUBLICATIONS

"Basic Principles: Polymeric Foams Preparation Processes, and Properties", Oct. 9–10, 1991, McCormick Center Hotel, Speaker: James L. Throne, Ph.D.

"Fluorine Compounds, Organic To Gold and Gold Compounds", Kirk–Othmer Encyclopedia of Chemical Technology, 3rd Ed., vol. 11, pp. 98–100 (undated).

"The Synthesis, Characterization, Reactions & Applications of Polymers", Comprehensive Polymer Science, vol. 1, p. 28 (undated).

"Cellular Structure and Properties of Foamed Polymers" Chap. 3, Dr. Fyodor A. Shutov, pp. 18–46 (undated).

"Processing of Polymers and Polymeric Composites", The American Society of Mechanical Engineers, MD–vol. 19, pp.197–212 (undated).

"Cellular Materials to Composites", Encyclopedia of Polymer Science and Engineering, vol. 3, pp.22–41 (1985). C&EN, Jun. 13, 1988 "Product Repot)".

"Polyolefin Foam", Handbook of Polymeric Foams and Foam Technology, Klempner & Frisch, p. 191 (undated).

"Microcellular Polycarbonate —Part I: Experiments on Bubble Nucleation and Growth", ANTEC '91, Kumar & Weller, pp. 1401–1405.

Plastics Handbook for the Technologist, Engineer and User, 2nd Ed., Hanser Publishers, Han Saechtling (undated).

Ultem Processing Data, PDS 04 1/90 GL 1,200 (undated). Handbook of Polymeric Foams and Foam Technology, Klempner & Frisch, Chapter 1 —Introduction undated).

Ultem Design Guide, Product Selection —Properties, pp. 3–22, ULT–201G (Jun. 1990)RTB.

Engineering Structural Foam Design Guide, Foam Processes, pp. 17–21, SFR–50B(Apr. 1990)RTB.

Engineering Structural Foam Design Guide, Product Selection, pp. 4–17, SFR–28A(Apr. 199)RTB.

"Synthesis of Microcellular Polycarbonate: A Phenomenological Study of Bubble Nucleation and Growth", Kumar et al., pp. 197–212 (undated).

S.W. Cha and N.P. Shu, "Room Temperature Microcellular Foaming," *Proceedings of the SPE–ANTEC* '92, 1992, pp. 1527–1531.

D.F. Baldwin and N.P. Suh, "Microcellular Poly(ethylene terephthalate) and Crystallizable Poly(ethylene terephthalate): Characterization of Process Variables," *Proceedings of the SPE–ANTEC* '92, 1992, pp. 1503–1507.

V. Kumar and N.P. Shu, "A Process for Making Microcellular Thermplastic Parts," *Polymer Engineering and Science*, vol. 30, No. 20, pp. 1323–1329, Oct. 1990.

D.F. Baldwin, N.P. Suh and M. Shimbo, "Gas Dissolution and Crystallization in Microcellular Thermoplastic Polyesters," MD–vol. 38, *Cellular Polymers*, ASME 1992, pp. 109–128.

C. Park and N.P. Shu, "Extrusion of Microcellular Filament: A Case Study of Axiomatic Design," MD–vol. 38, *Cellular Polymers*, ASME 1992, pp. 69–91.

○ 4,000 psig

METHOD OF MAKING THERMOPLASTIC FOAMED ARTICLES USING SUPERCRITICAL FLUID

This is a continuation-in-part of application Ser. No. 08/016,602 filed Feb. 11, 1993, now abandoned.

TECHNICAL FIELD

This invention relates to partially to fully foamed articles and a process using supercritical fluids for making the same.

BACKGROUND OF THE INVENTION

Foamed polymers are used in a wide variety of structural applications when weight savings are desired, but as is often the case, foam strength is often sacrificed as the density is reduced. This may be due to the size of the cells resulting from the foaming process.

The preparation of a polymeric foam typically involves (1) the formation of gas bubbles in a liquid system, (2) the growth of these bubbles to form cells, and (3) the stabilization of the cells by viscosity increase and/or solidification of the foamed media. There are two major classifications of methods for foam production, (1) chemical methods and (2) physical methods.

In the chemical method, a gas phase may be obtained using a gas in liquid polymer phase. The gas is typically dispersed within the liquid polymer phase. The gas may be obtained either as a by-product of a polymerization reaction, or generated by thermal decomposition of an added compound (blowing agent) to the polymer base. Since chemical methods are applicable only over a limited temperature range, the viscosity of the polymer determines the resultant cellular structure.

There are several commonly known physical methods of producing foams. In one method, air, $N_2$ or other gas is dispersed into a polymeric starting material at a high pressure and a temperature below the glass transition temperature. When the pressure is released, a supersaturated specimen is produced. When this specimen is then heated to the glass transition temperature, a large number of bubbles nucleate. In the second method, low-boiling liquids (blowing agents), such as chlorofluorocarbons or hydrocarbons are dispersed into the polymeric starting material. The mixture is then heated and the blowing agent is volatilized, thereby forming cells in the polymeric starting material. The viscosity using a physical method is controlled by the temperature at which foaming is to occur.

These conventional processes, both chemical and physical methods, employ the use of chemical blowing agents, or gases for producing a foamed article. The type of foaming process used is generally dictated by the class of polymeric starting material and the desired density or cell size. Such processes may also incorporate the use of adjuvants, such as co-solvents, co-blowing agents, nucleating agents, and/or plasticizers to aid and assist in the nucleation of bubbles. Typically, plasticizers are added for nucleating bubbles or reducing the viscosity of the polymeric starting material to make it more conducive to cell formation.

However, using some adjuvants can present problems in that they may have to be removed by washing or extraction steps, thus complicating the foaming processing. This can be a problem when the resulting foamed articles are used in bio-medical applications and such adjuvants may cause undesireable reactions.

Additionally, the conventional processes are limited in a number of other ways, such as (1) restrictive classes of polymers that can be foamed, (2) limitations of controllability of the density of the foamed polymer, (3) lack of control over the cell size formed; (4) undesirable residuals remaining in the polymers; or (5) sacrificing foam strength to obtain low density.

In order to improve the mechanical properties of cellular foamed articles, microcellular processes have been developed for manufacturing foamed plastics having greater cell densities and smaller cell sizes. These processes include presaturating the polymeric material with a uniform concentration of a gas under pressure and the provision of a sudden induction of thermodynamic instability to nucleate a large number of cells. For example, the material may be presaturated with the gas and maintained under pressure at its glass transition temperature. The material is suddenly exposed to a low pressure to nucleate cells and promote cell growth to a desired size, depending on the desired final density, thereby producing a foamed material having microcellular voids, or cells, therein. The material is then quickly further cooled, or quenched to maintain the microcellular structure.

Such techniques tend to increase the cell density, that is, the number of cells per unit volume of the parent material, and to produce much smaller cell sizes than those in typical cellular structures. Many microcellular processes tend to provide cell sizes that are generally smaller than the critical sizes of flaws that preexist in polymers so that the densities and the mechanical properties of the materials involved can be controlled without sacrificing the mechanical properties of some polymers. Such presses have produced materials having average cells sizes in the range of 2 to 10 micrometers, with void fractions of up to 50% of the total volume and cell densities of about $10^9$ voids/cm$^3$ of parent material.

Other processes are described wherein extremely small cell sizes and high cell densities are produced. The microcellular plastics have been processed at or near ambient temperature, so as to eliminate the need to heat the plastic during the process, thereby simplifying the manufacturing process.

As an example, publications by MIT describe a method wherein a two "pot" process is used to provide foamed articles. First, the article is saturated with a super critical fluid above the critical pressure and temperature: then the pressure is released, the temperature drops to near ambient and the article is removed. At ambient pressure, the temperature is then increased to cause foaming. This results in loss of some of the dissolved gas from the article during the heat-up step, and subsequently less reduction of density. As described, use of a super critical fluid above critical conditions takes place during the saturation step. The second separate step of initiating foaming begins at noncritical conditions.

SUMMARY OF THE INVENTION

Briefly, in one aspect of the present invention, a foamed article is provided comprising a thermoplastic having a foamed density of greater than 0.03 grams per cubic centimeters (g/cm$^3$), cell sizes in the range of 10 to 300 micrometers (μm), preferably 20–100 μm, most preferably 20–80 μm, with cell wall thicknesses of greater than 0.1 μm but less than 2 μm.

Generally, the thermoplastic polymers identified herein that are suitable for use in practicing the present invention may have amorphous, semi-crystalline, or crystalline morphologies, preferably the thermoplastic polymers have amorphous or semi-crystalline morphologies. The physical form of the polymers include but are not limited to thin films, beads, rods, thick sheets, bars, or other shapes. More preferably, the foamed article is a thermoplastic having a glass transition temperature above 150° C. and has a density of greater than 0.08 g/cm³, cell sizes in the range of 10 to 300 µm, preferably from 80 to 300 µm, with wall thicknesses of greater than 0.1 µm but less than 2 µm.

In yet another aspect of the present invention, partially foamed articles are provided. "Partially foamed" as used in this application means the polymer starting material is retained in its unfoamed state at the interior of the article, surrounded by an external low density fully foamed layer. Such a partially foamed article is prepared using the process of the present invention and adjusting the duration of the saturating step, hence the depth of supercritical fluid (SCF) penetration can be varied. Since there typically exists a line of demarcation between the SCF saturated and unsaturated portion of the polymer, a distinct boundary is produced in the polymer starting material when rapid depressurization occurs.

In another aspect of the present invention, a process is provided for producing low density cellular and microcellular foamed thermoplastic articles comprising the steps:

(1) charging a pressure vessel with a solid thermoplastic polymer;

(2) heating the pressure vessel containing the solid thermoplastic polymer to a predetermined saturation temperature using an external heat source, heated to a temperature at or near the Vicat softening point of the solid thermoplastic polymer;

(3) simultaneously charging a gas, while heating the pressure vessel;

(4) equilibrating the pressure vessel, the thermoplastic polymer, and the gas with the heat source temperature;

(5) adjusting the pressure in the pressure vessel by adding additional gas to achieve a final pressure such that the gas is a supercritical fluid (gases in their supercritical state) and soluble in the thermoplastic polymer;

(6) saturating the thermoplastic polymer for a predetermined period of time; and (7) venting the pressure vessel to rapidly depressurize the pressure vessel to produce a low density cellular and microcellular foamed thermoplastic article.

In yet another aspect of the process of the present invention, additives may be added to the pressure vessel during step (1). Nonlimiting examples of additives include solvents, emulsifiers, fillers, hollow particles (produces syntactic foams), reinforcements, colorants, coupling agents, antioxidants, antistatic compounds, flame retardants, heat stabilizers, lubricants, mold release agents, plasticizers, preservatives, ultraviolet stabilizers and the like. These additives may vary according to the thermoplastic and the application use of the foamed article. One or more additives may be contained in the foamed article. The amount of additive present is dependent on the application use of the foamed article and may be present in an amount that is effective for the known use of a particular additive.

It should be noted to those skilled in the art that there may be many variations to this procedure provided the temperature and pressure conditions are such that the thermoplastic polymer/gas system is under supercritical fluid conditions for the duration of the saturation period. Advantageously, the process of the present invention provides the ability to foam preformed articles having an initial (pre-foamed) thickness of greater than 75 µm. In the process of the present invention, high strength foams can be readily be achieved, but not at the expense of obtaining low density foams, which may be important for many applications.

Other advantages of the process of the present invention include but are not limited to preparation of (1) low density foams from a variety of thermoplastic polymer materials, including high temperature thermoplastics, co-polymers or polymer blends, and thermoplastic materials containing high molecular weight plasticizers without extraction of the plasticizers; (2) small or microcellular foams; (3) high strength materials; (4) foams essentially free of toxic residuals; (5) foams essentially free of residual nucleation agents; (6) foamed materials of any thickness; (7) foams having various shapes or forms, such as beads, films, and fibers; and (8) partially foamed thermoplastics having a controllable foam depth.

The present application describes a one "pot" process whereby both saturation with a SCF and initiation of foaming are carried out above the critical conditions of the SCF, with the proviso the saturation temperature be in the range of the Vicat softening temperature of the polymer to be foamed. This provides several advantages and improvements over previously disclosed methods.

Some advantages of this approach include: (1) all the supercritical fluid is retained in the article thus providing greater reduction of density as well as; (2) production of foamed articles of greater thickness; (3) the process is self-quenching, thus making it easier to control the characteristics of the final foam throughout the entire thickness; and (4) foamed articles with shear strengths comparable to those comprised of smaller cell sizes (10 micrometers versus ≧20 micrometers diameter) are achieved [See p. 17, lines 16–18. FIG. 13 (in this application)].

DESCRIPTION OF THE PREFERRED EMBODIMENT(S)

Foamed Articles

A foamed article is provided comprising a thermoplastic having a foamed density of greater than 0.03 grams per cubic centimeters (g/cm$^3$), cell sizes in the range of 10 to 300 micrometers (μm), preferably 20–100 μm, most preferably 20–80 μm, with cell wall thicknesses of greater than 0.1 μm but less than 2 μm. In an alternative embodiment, the foamed article is a thermoplastic having a glass transition temperature above 150° C. and has a density of greater than 0.08 g/cm$^3$, cell sizes in the range of 10 to 300 μm, preferably 80–300 μm, with wall thicknesses of greater than 0.1 μm but less than 2 μm. Foam void volumes range from 5 to 97+%.

Figure 1:
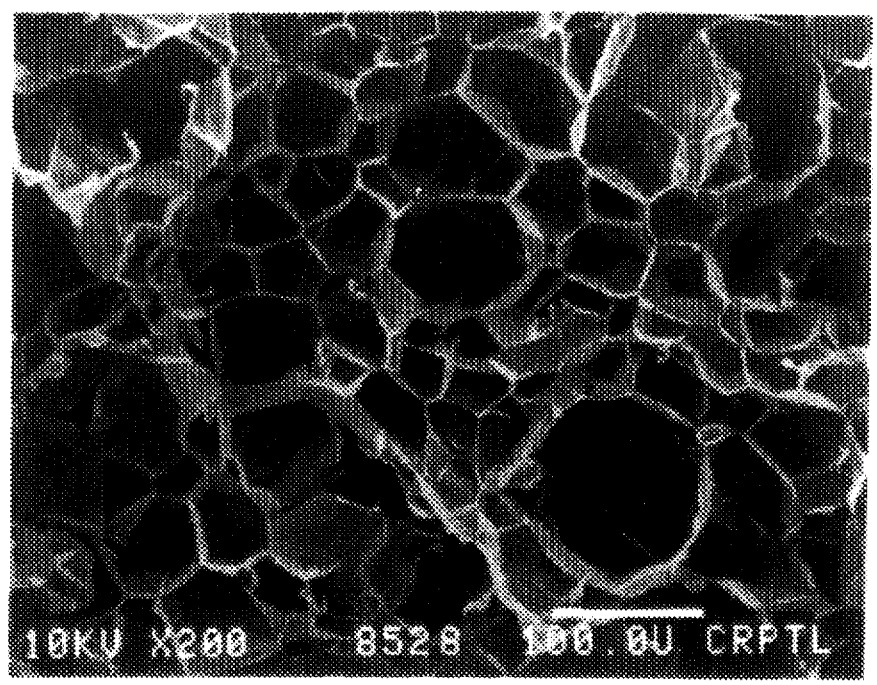
FIG. 1 is a scanning electron micrograph of a typical cross-sectional view of foamed polymethylmethacrylate at a magnification of 200 times.
Figure 2:
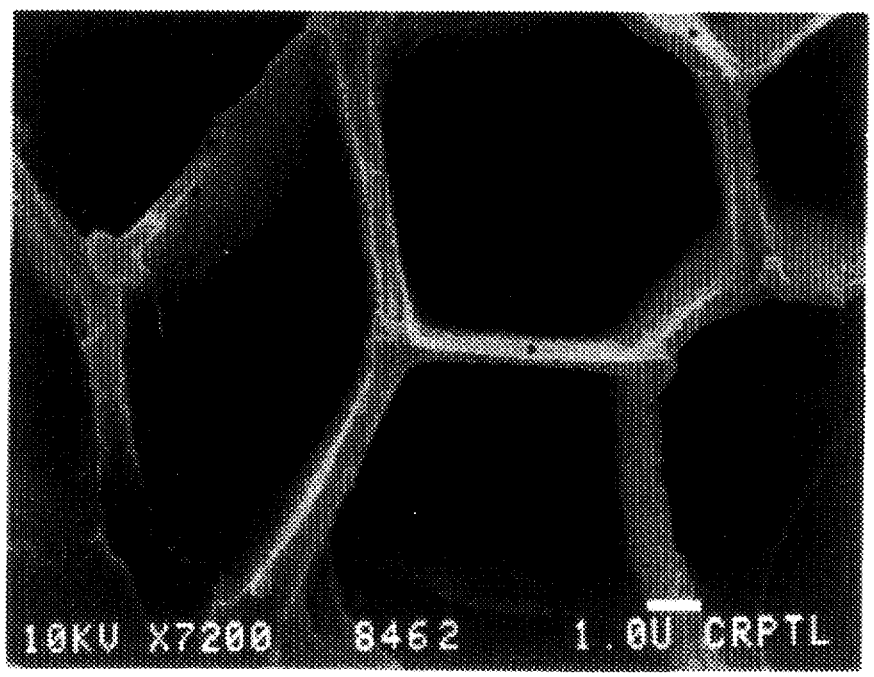
FIG. 2 is a scanning electron micrograph of a typical cross-sectional view of foamed polyetherimide at a magnification of 7200 times.
Figure 3:
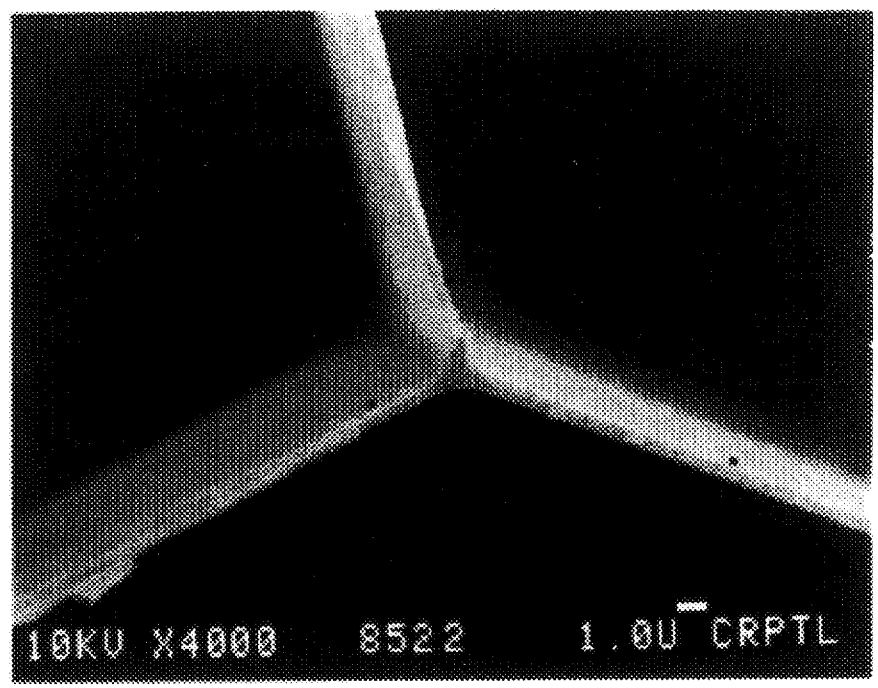
FIG. 3 is a scanning electron micrograph of a typical cross-sectional view of foamed polycarbonate at a magnification of 4000 times showing a vertice in detail.
Figure 4:
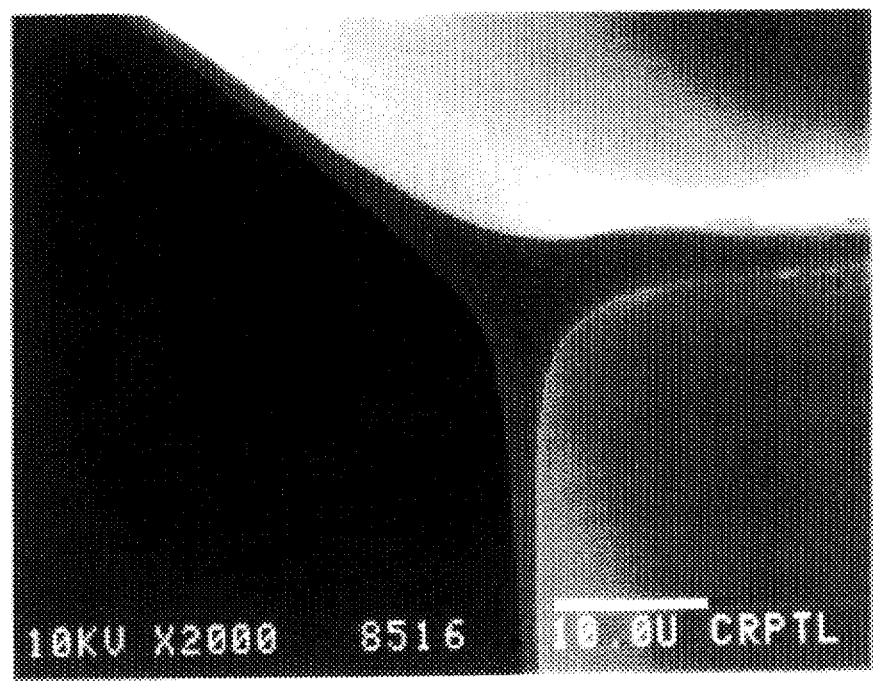
FIG. 4 is a scanning electron micrograph of a typical cross-sectional view of foamed polyetherimide at a magnification of 2000 times showing a vertice in detail.

Representative examples of the foamed articles of the present invention are illustrated in FIGS. 1–4. Referring to FIG. 1, a foamed polymethylmethacrylate having cell sizes in the range of 20 to 100 μm is illustrated. Referring to FIG. 2, cells of a foamed polyetherimide are illustrated. The polyetherimide foam had a density of 0.6 g/cm$^3$. A vertice of cell in foamed polycarbonate (density of 0.2 g/cm$^3$) is shown in detail in FIG. 3. A vertice of a cell in foamed polyetherimide (density of 0.09 g/cm$^3$) is shown in detail in FIG. 4.

The cells may be open or closed, although the foams are predominately composed of closed cells. The shape of the cells may be elongated and have an aspect ratio of about 2.0 or more. However, the cells are generally a more uniform, polyhedral shape. The cell shapes are similar to bubbles whose juxtaposition to one another tend to cause their sides to become flattened as they expand and squeeze against one another. This pattern is typical of a fully formed 3-D Voronoi tessellation foam. The SEM photograph in FIG. 2 shows a typical cell structure in a foamed article of the present invention.

Syntactic foams and foams that contain particles dispersed in the polymeric starting material are also provided. Suitable particles include but are not limited to other polymers, glass bubbles, metal particles, fibers or other such materials.

Figure 5:
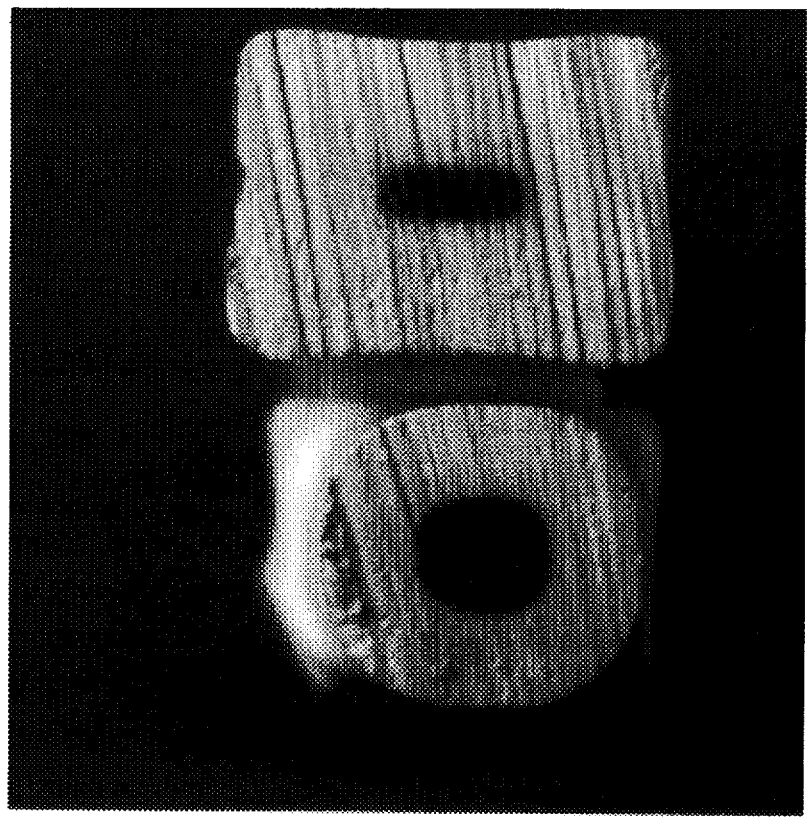
FIG. 5 is a scanning electron micrograph of a typical cross-sectional view of a partially foamed article of the present invention.

Partially foamed articles are also provided. "Partially foamed" as used in this application means a portion of the thermoplastic polymer starting material is retained in its unfoamed state at the interior of the article, that is, the central core of the article and is surrounded by a low density fully foamed layer. A representative example of a partially foamed article is illustrated in FIG. 5. Such a partially foamed article may be prepared using the process of the present invention. The thickness of the fully foamed layer depends on the depth of SCF penetration and such penetration can be varied by adjusting the duration of the saturating step. Since there typically exists a line of demarcation between the SCF saturated and unsaturated portion of the polymer, a distinct boundary is produced in the polymer starting material when rapid depressurization occurs.

In addition to controlling the penetration depth of the SCF during the process of the present invention, layered, multi-layered or alternating foamed and unfoamed composites may be prepared by treating fully foamed or partially foamed articles with a thermal energy source, such as a laser. By exposing the surface or surfaces of the foamed article to a laser, the outer layers may be melted or collapsed thereby causing the foamed polymer to revert back to original unfoamed polymer. For example, an unfoamed shell can be prepared around a foamed potion that surrounds the unfoamed core. If the polymer was completely foamed, then an unfoamed shell or skin can be constructed around or on one or more sides of a foamed core.

Suitable thermoplastic polymers and co-polymers may have amorphorous, semi-crystalline or crystalline morphologies. Nonlimiting examples of such thermoplastic polymers and co-polymers include: cellulose propionate, triacetates, ethyl cellulose, polyoxymethylene, polyisobutylene, polymethylpentene, polybutene, polypropylene, polyethylene, polystyrene, acrylonitrile copolymer, polyacrylate, polyetheretherketone, polymethacrylate, polyvinylchloride, polyvinylidene chloride, polyvinyl acetate, polyvinyl alcohol and acetal, polyvinyl ether, polyvinylidene fluoride, polytetrafluoroethylene, polyphenylene oxide ("Noryl" commercially available from General Electric), polyethylene:tetrafluoroethylene ("Tefzel" commercially available from DuPont), polyamide, polyesteramide, thermoplastic elastomers, such as polyurethane, linear polyesters, polycarbonates, silicones, polyetherimide (such as "Ultem" commercially available from General Electric), and polyimide. Particularly advantageous thermoplastic polymers and co-polymers are those having a glass transistion temperature above 150° C.

Fully or partially foamed articles may contain a variety of additives. Such additives may or may not be in addition to hollow particles (syntactic foams) or filled foams. Nonlimiting additives include but are not limited to solvents, emulsifiers, fillers, reinforcements, colorants, coupling agents, antioxidants, antistatic compounds, flame retardants, heat stabilizers, lubricants, mold release agents, plasticizers, preservatives, ultraviolet stabilizers and the like. These additives may vary according to the thermoplastic and the application use of the foamed article. One or more additives may be contained in the foamed article. The amount of additive present is dependent on the application use of the foamed article and may be present in an amount that is effective for the known use of a particular additive.

SCF Process

A process for producing low density microcellular foamed thermoplastic articles comprising the steps:

(1) charging a pressure vessel with a solid thermoplastic polymer;

(2) heating the pressure vessel containing the solid thermoplastic polymer to a predetermined saturation temperature using an external heat source, heated to a temperature at or near the Vicat softening point of the solid thermoplastic polymer;

(3) simultaneously charging a gas, while heating the pressure vessel;

(4) equilibrating the pressure vessel, the thermoplastic polymer, and the gas with the heat source temperature;

(5) adjusting the pressure in the pressure vessel by adding additional gas to achieve a final pressure such that the gas is a supercritical fluid (gases in their supercritical state) and soluble in the thermoplastic polymer;

(6) saturating the thermoplastic polymer for a predetermined period of time; and (7) venting the pressure vessel to rapidly depressurize the pressure vessel to foam low density microcellular foamed thermoplastic articles.

It should be noted to those skilled in the art that there may be many variations to this procedure provided the temperature and pressure conditions are such that the thermoplastic polymer/gas system is under supercritical fluid conditions for the duration of the saturation period. Advantageously, the process of the present invention provides the ability to foam preformed articles having an initial (pre-foamed) thickness of greater than 75 μm. In the process of the present invention, high strength foams can readily be achieved, but not at the expense of obtaining low density foams, which may be important for many applications.

The process of the present invention comprises exposing and allowing saturation of a polymeric material to a SCF. While not intending to be bound by theory, it is believed the SCF has the chemical effect of plasticization and solvation of the polymeric starting material. The physical effect is that SCF generates a high pressure within the polymeric starting material to physically displace viscous polymers and blow the bubbles or cells when depressurization of the pressure vessel occurs.

A SCF can be defined as a material that is maintained at a temperature that exceeds a critical temperature and at a pressure that exceeds a critical pressure so as to place the material in a supercritical state. In such a state, the SCF has properties that cause it to act, in effect, as both a gas and a liquid. Thus, in the supercritical state, such a fluid has the solvent characteristics of a liquid, but the surface tension thereof is substantially less than that of a liquid so that the fluid can diffuse much more readily into the solute material, as in the nature of a gas.

Figure 6A:
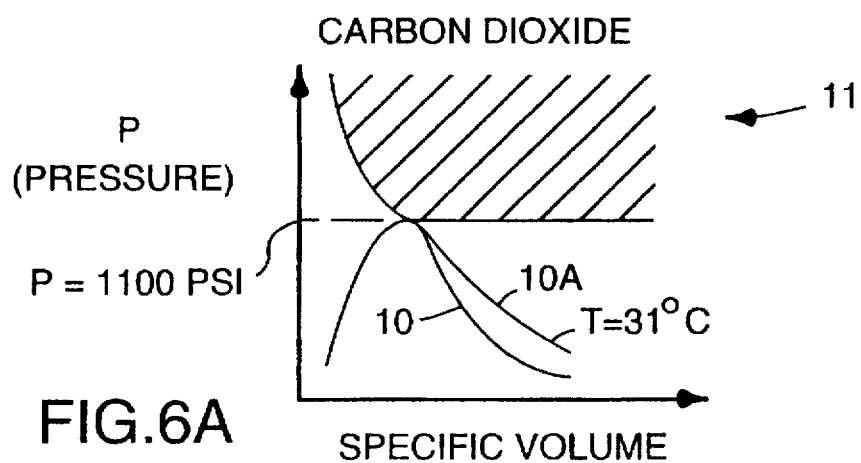
FIG. 6A and 6B are graphical representations of pressure vs. specific volume showing the region in which a supercritical state is achieved for carbon dioxide.
Figure 6B:
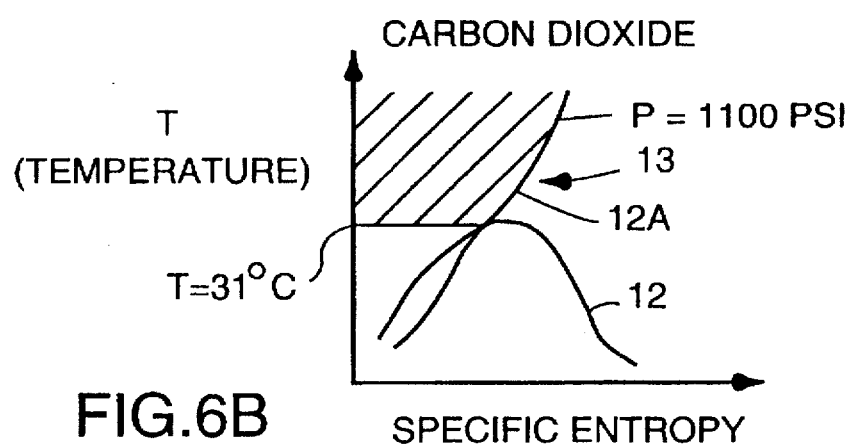
Figure 6C:
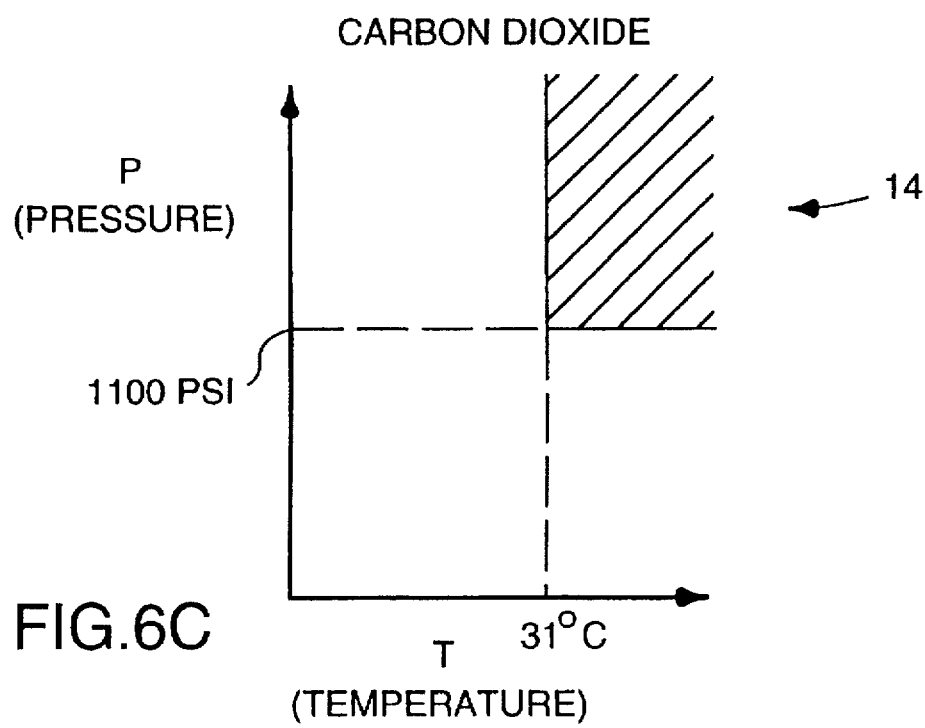
FIG. 6C is a graphical representation of pressure vs. temperature showing the region in which a supercritical state is achieved for carbon dioxide.

For example, it is known that carbon dioxide ($CO_2$) can be placed in a supercritical state when its temperature exceeds 31° C. and its pressure exceeds 1100 psi. FIGS. 6A and 6B depicts (curves 10 and 12) pressure vs. specific volume (FIG. 6A) and temperature vs. specific entropy (FIG. 6B) for $CO_2$. When the pressure is above 1100 psi and the temperature is above 31° C. (curves 10A and 12A), $CO_2$ is provided in its supercritical state (shaded regions 11 and 13). As depicted in another way, FIG. 6C shows pressure vs. temperature for $CO_2$ in which such critical pressure (1100 psi) and critical temperature (31° C.) are depicted so as to define the critical state by the shaded region (14). The terms "critical fluid (CF)" or "SCF" are used interchangeably in this invention and the terms mean any temperature and pressure combination of a substance above the critical point value.

The SCFs suitable for use in this invention should be non-reactive to the thermoplastic polymer. Generally, suitable SCFs have physico-chemical characteristics such that the combination of critical fluid pressure and solubility parameter at saturation conditions, result in a potential pressure differential of at least 1,100 psig or greater. SCFs exhibit thermodynamic and physical properties that are unique to the CF state and are generally intermediate between gas state properties and liquid state properties. The thermodynamic and physical properties vary with pressure. Some representative characteristics include diffusivity, density, dynamic viscosity, cohesive energy density, heat capacity, and thermal conductivity. Within the CF region (illustrated in the shaded regions of FIGS. 6A–6C), changes in system pressure have significant effects on the resultant density of the critical fluids, as well as affecting other properties, hence the solvent and behavior characteristics can be greatly varied by changes in the system pressure. This effect is contrary to normal liquid solvents or gases that have only fixed physical properties, hence have no variable characteristics.

Figure 7:
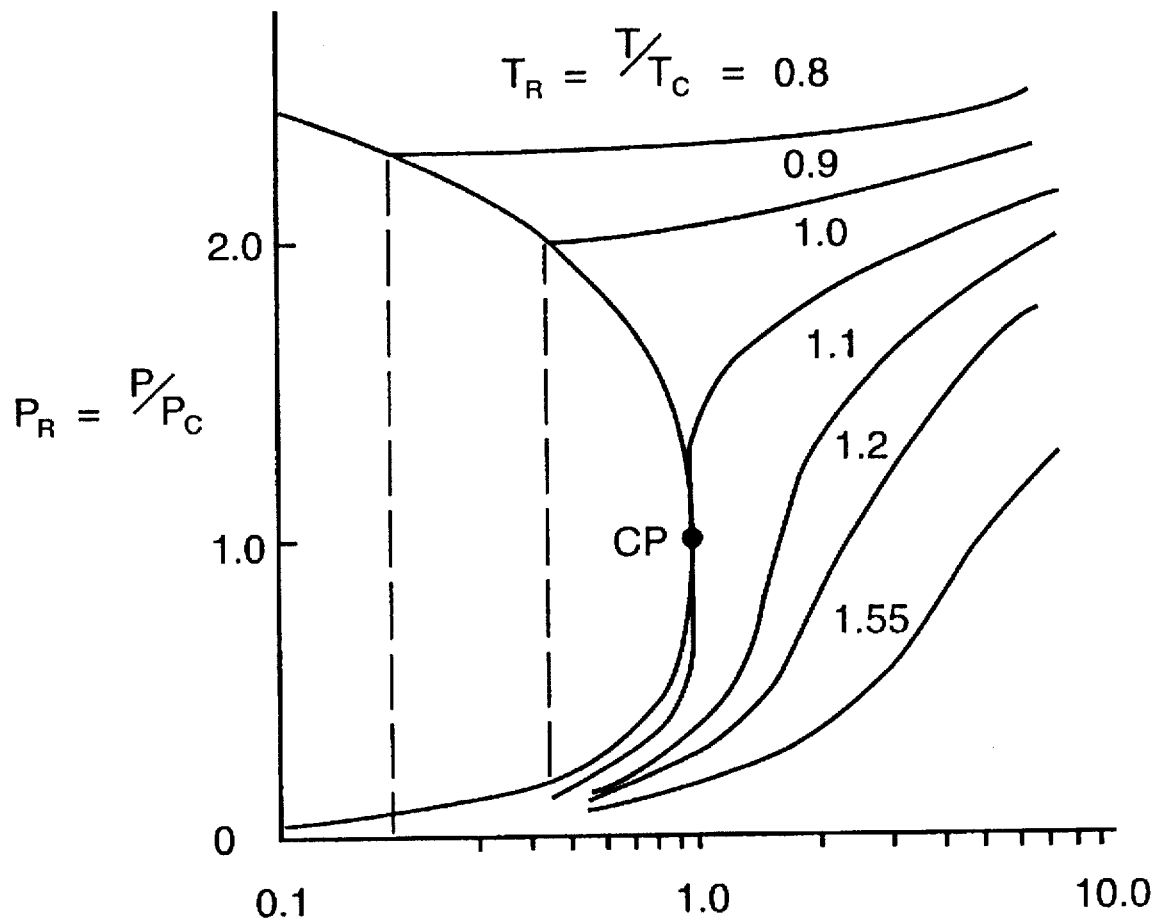
FIG. 7 is a graphical representation of critical fluid reduced density vs. reduced pressure.

For instance, if a plot were made of a critical fluid reduced density versus reduced pressure as in FIG. 7, for a temperature close to the critical point, small changes in pressure cause large changes in the supercritical fluid density, wherein P is the pressure, $P_c$ and $P_R$ is the critical pressure and the reduced pressure, respectively and T is the temperature and $T_C$ and $T_R$ is the critical temperature and the reduced temperature, respectively. As the temperature exceeds the critical point, pressure changes do not have as great an impact on the density of the fluid, although there is still nevertheless, a variable density. This reduction in the fluid density with increasing divergence from the critical point, affects the fluid densities that can be attained at reasonable pressures, such that compounds like nitrogen cannot be easily and readily densified at pressures conveniently or economically available in industry on large scale. Critical point data for a number of gases, suitable for use in this invention, are published in the Matheson Gas Data book, the Merck Index, Lange's Handbook of Chemistry, the CRC Handbook of Chemistry and Physics and other sources.

The type of critical fluid employed can influence the resultant foam, as solubility from one SCF to another varies by several weight percent in a particular polymer system, hence void size and distribution can vary. As the temperature of the polymer is increased, so will the size of the cells that form. Generally, this size can be reduced by increasing SCF pressure.

Gases that are suitable supercritical fluids and are useful in practicing this invention include, but are not limited to, carbon dioxide, nitrous oxide, ethylene, ethane, tetrafluoroethylene, perfluoroethane, tetrafluoromethane, trifluoromethane, 1,1-difluoroethylene, trifluoroamide oxide, cis-difluorodiazine, trans-difluorodiazine, nitrogen chloride difluoride, phosphorous trideuteride, dinitrogen tetrafluoride, ozone, phosphine, nitrosyl fluoride, nitrogen trifluoride, deuterium chloride, hydrogen chloride, xenon, sulfur hexafluoride, fluoromethane, perfluoroethane, tetrafluoroethene, pentafluoroethane, tetrafluoromethane, trifluoromethane, 1,1-difluoroethene, ethyne, diborane, tetrafluorohydrazine, silane, silicon tetrafluoride, germanium tetrahydride, boron trifluoride, carbonyl fluoride, chlorotrifluoromethane, bromotrifluoromethane and vinyl fluoride. The preferred gases include carbon dioxide, nitrous oxide, ethylene, ethane, tetrafluoroethylene, perfluoroethane, tetrafluoromethane, trifluoromethane, and 1,1-difluoroethylene. The more preferred gas is carbon dioxide since carbon dioxide is non flammable, and nontoxic,as well as being relatively inexpensive.

The preferred SCF, $CO_2$, is thermally stable and non-reactive to most polymer systems, even at high process temperatures. For example, $CO_2$ can effectively be used to produce foams of high temperature thermoplastics (for example, those with Vicat softening temperatures above 150° C.), such as polyetherimide where conventional blowing agents would either decompose well before the polymer was in a viscosity range that could allow any cell growth to occur or cells would be very large. Using the process of the present invention offers the advantage of controlling both the density and cell size of such high temperature polymers.

In yet another aspect of the process of the present invention, additives may be added to the pressure vessel during step (1). Nonlimiting examples of additives include solvents, emulsifiers, fillers, hollow particles (produces syntactic foams), reinforcements, colorants, coupling agents, antioxidants, antistatic compounds, flame retardants, heat stabilizers, lubricants, mold release agents, plasticizers, preservatives, ultraviolet stabilizers and the like. These additives may vary according to the thermoplastic and the application use of the foamed article. One or more additives may be contained in the foamed article. The amount of additive present is dependent on the application use of the foamed article and may be present in an amount that is effective for the known use of a particular additive.

Solvents, in particular solvents that solubilize the thermoplastic polymers are particularly useful additives. Non-limiting examples of such solvents include aromatic hydrocarbons, ketones, ethers, aliphatic hydrocarbons, chlorinated hydrocarbons and the like. The most preferred solvent is methylene chloride. The added solvent may be used in amounts up to about 40 weight percent of the SCF.

The process of the present invention comprises charging a pressure vessel with a gas and a thermoplastic polymer material and heating the thermoplastic polymer material charged into a pressure vessel via an external heat source, such as an oil bath, to a temperature approaching the Vicat softening temperature (as determined from ASTM D 1525-91) or the glass transition temperature of the thermoplastic polymer material. The pressure and temperature are such that the gas is in a supercritical state. The pressure may be adjusted by adding or venting the gas. After an appropriate duration for saturation, the SCF is rapidly evacuated from the void spaces of the pressure vessel. During this rapid depressurization, the SCF that has been dissolved in the polymer rapidly nucleates and grows bubbles or cells in the softened polymer. Since the expanding SCF or gas undergoes an adiabatic or a Joule-Thomson expansion, the polymer is also rapidly cooled. The temperature reduction of the polymer is sufficient to reduce the polymer temperature to a range below which the material no longer has enough fluidity to continue expanding, that is, rapid depressurization provides a self-quenching mechanism. Hence, the polymer is stabilized and deformation can no longer occur. This eliminates the necessity of separately cooling or quenching the reaction to stabilize the foamed article. However, it is often preferable to remove surrounding residual heat to avoid "melt back", that is, cell collapse, and such removal may include, for example, immersion of the pressure vessel into a low temperature water bath.

In a first approximation for a starting point, an evaluation is made using known values of the polymer glass transition temperature ($T_g$) and/or the polymer melting point ($T_m$). In the absence of such data or where such data may not be applicable to a polymer, a softening point such as Vicat may be used. For example, using the inventive process and working at a fixed pressure, the initial temperature selected would be slightly above the $T_g$ or Vicat softening temperature. The process would then be repeated with incremental changes, such as in the range of 3° to 8° C. for each step, above and below the initial temperature. This is done for at least two, preferably three or more temperatures above and below the initial temperature. The density of the resulting foam is measured according to ASTM D792-86 modified as described below in the Examples. The data acquired is then plotted as "Density vs Temperature". From this generally U-shaped curve, appropriate conditions may be selected to provide desired foam characteristics.

Alternatively, the temperature may be held constant, and the pressure varied. A plot of "Density vs Pressure" can then be obtained which will exhibit the same general shape as described above. It is desirable to ensure that any changes in either temperature or pressure are such that the supercritical fluid is maintained in this state (see FIG. 6C, shaded region).

Figure 8:
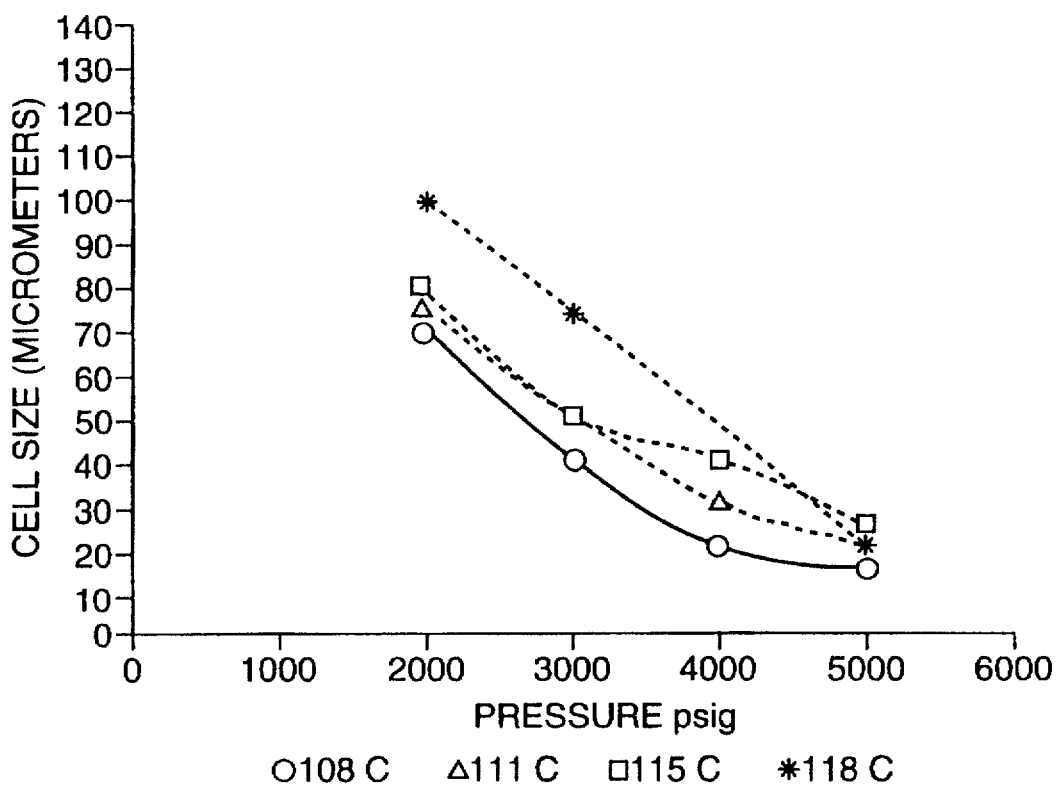
FIG. 8 is a graphical representation of cell size (micrometer) vs pressure (psig) for polystyrene.

Since the curves plotted as explained above are generally U-shaped, there are two temperatures (or pressures) at which the same density foam will be obtained. However, the two foamed articles thus obtained tend to exhibit different cell sizes, even though the total void volume, and thus density, are the same. While not intending to be bound by theory, it is believed that at the higher temperature cells that nucleate may grow or expand more rapidly in the softened polymer, thereby forming a fewer number of larger sized cells. Alternatively, at the lower temperature, greater cell nucleation occurs with less expansion, thus the cells are larger in number and smaller in size. Higher pressures can produce the same effect as lower temperatures. This can be seen in FIGS. 8 & 9 the plots of "Foam Cell Size vs Temperature" and "Foam Cell Size vs Pressure" for polystyrene, which shows smaller cell sizes resulting at lower temperatures or higher pressures.

Figure 13:
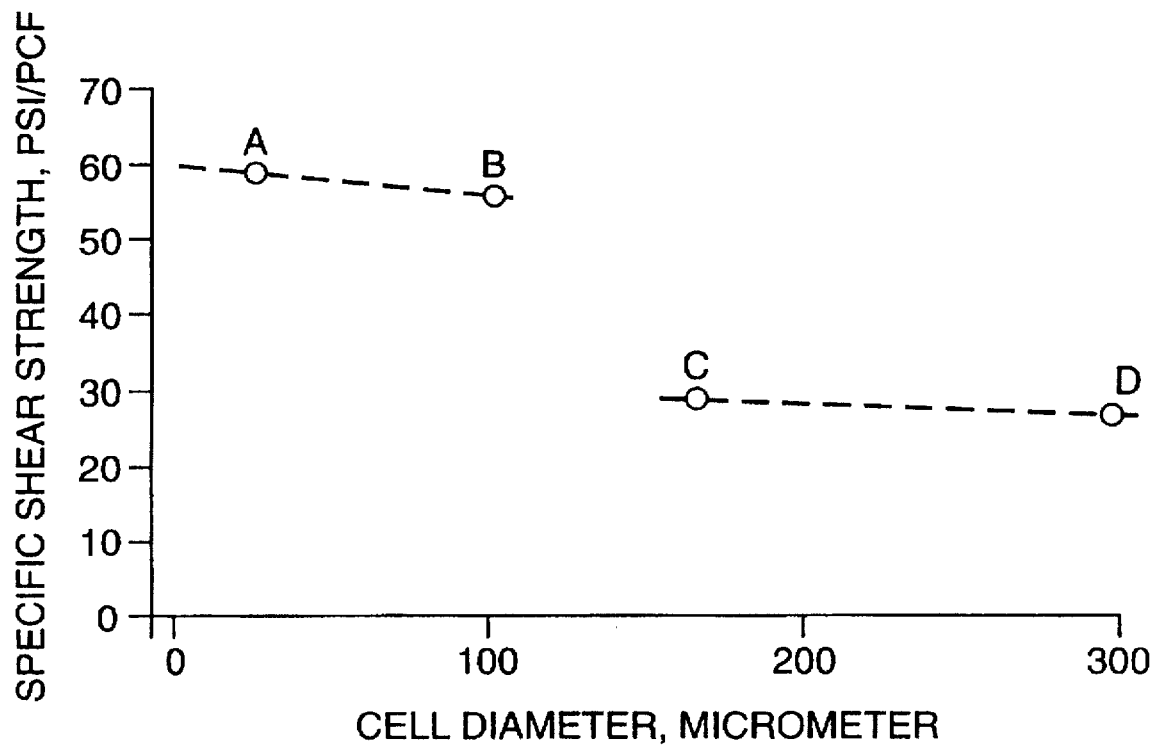
FIG. 13 is a graphical representation of specific shear strength (psi/pcf) vs cell diameter (micrometers).

Shear strength has been reported to be the single most important property in the use of core materials in structures. The strength is strongly dependent on the material density. See "Foam Filled Composite Sandwich Structures for Marine Application," presented by Northrop at a conference name in Savannah, Ga., 11/93. Further, the cell size has been demonstrated to be critical to the shear strength properties of the foamed article (see FIG. 13). At a given density, a stronger foam is obtained from smaller cells.

For a polymer/gas system, the optimum temperature and pressure, to prepare a polymer with the lowest density, smallest cell size and highest strength, can be experimentally determined by evaluating the plots described above.

It has been found that small quantities of moisture in the polymer/gas system will affect the foaming action; providing larger cell diameters than may be attained from only the polymer/gas system. By drying the polymer materials prior to foaming, low levels of residual moisture can be removed, which themselves contribute an expansion effect on the soft polymer. Any conventional drying procedure for polymers known to those skilled in the art may be used in practicing this invention.

Since the polymer is soft and pliable during the process, it is often desirable to constrain the polymer in a device or mold during depressurization, restricting movement of the sample. Rapid depressurization of the pressure vessel can cause the foaming piece to be tossed, distorting the sample. A constraining device or mold may be any shape, since the expanding polymer will fill the cavity of the device or mold as the cells grow.

The density and cell size of the foamed article can also be influenced by the molecular weight of the polymeric starting material. As the melt viscosity (or melt index) of the polymeric starting material increases with increasing molecular weight, the conditions required to foam the polymeric starting material may also vary. For example, the temperature at which the minimum density is achieved tends to shift as polymer molecular weight (as indicated by its' melt index) increases.

The SCF should have some degree of solubility in the polymeric starting material. Generally, if polymer films are too thin so as to permit a rapid rate of diffusion of the SCF out of the material, the SCF is not retained within the film for a period sufficient enough to perform a work of expansion, that is, no foaming is observed. This phenomena is observed with a film thickness avenging 0.13 mm or less and depends upon the process condition; as well as the type of material. Thick samples, in excess of 6.35 mm may be readily foamed, but as the samples become thicker, diffusion time (saturation times) increases. The time required for diffusion is also polymer specific and may be limited by factors that typically limit diffusion processes, such as temperature, pressure, and the SCF selected. Under process conditions, the SCF diffuses promptly into the polymer under an elevated temperature and pressure state. It has been observed the $T_g$ of the polymer may be significantly lowered during gas saturation processes and it is believed this is due to the plasticization effect of the gas in the polymer.

Solubility parameters can be useful for characterizing SCF/polymer systems. The solubility parameter of a SCF is a function of critical fluid pressure and temperature. As the difference between solvent solubility parameter and polymer solubility parameter become greater, less SCF becomes dissolved in the polymer. Typically, the greater the difference between the solubility parameter of the solvent and the polymer, the less likely effective solubilization will take place and complete dissolution will not occur. As a result the polymer will not dissolve but instead will only swell in the solvent. The amount of swelling depends upon the degree of affinity between the polymer and solvent. The suitability of a SCF to solvate and plasticize a particular polymer is based upon the solvent strength that can be developed in the process, which in turn is dependent on its state relative to its critical conditions. The solvation property of the SCF is a contributing factor to the foaming process.

Foamed polymers are produced according to this process by exposing a polymer to a suitable SCF, at temperatures between ambient and the polymer $T_m$. SCF pressures up to 96 MPa (14,000 psig) have been used to give the necessary solubility. With high, liquid-like fluid densities, the polymer swells as it would in a normal organic solvent due to a relaxation of the polymer chain interaction with its neighbors. Heating the polymer allows further relaxation and softening so it becomes more pliable for the subsequent expansion step.

Once the polymer has reached an equilibrium saturation with the SCF, (for fully formed articles) the pressure vessel is rapidly vented at the processing temperature, thus allowing the dissolved SCF in the softened polymer to expand the polymer, producing cells. A rapid rate of venting is preferable to achieve the maximum in foaming action. The rapid venting allows the warm, plasticized, softened polymer to expand easily before cooling is sufficient enough to freeze the free movement of the polymer. Slow venting inhibits the work of expansion of the SCF and allows some diffusion out of the softened polymer without nucleating cells, thereby limiting the final density of the polymer. Typically, the cells in a foaming system would collapse as they are produced under the force of the expanding SCF. Under rapid depressurization cell expansion is effectively inhibited by the solidification of the foam as the foamed material adiabatically cools.

Generally, the greater the amount of SCF trapped or dissolved (as determined by SCF pressure) in the polymer, the greater the number of cells formed and the larger the overall void volume increase. Generally, the larger the pressure drop, the smaller the cell diameter (at a given temperature). The final density is determined by the pre-expansion temperature and the type of SCF used. Generally, the higher the pre-expansion temperature at the start of depressurization, the lower the final density, the higher the pressure, the smaller the cells.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

All density determinations were made using a modified ASTM Method D792-86, "Standard Method for Specific Gravity and Density of Plastics by Displacement." The modifications were as follows: (1) the samples were not temperature conditioned for 40 hours prior to the density determination, and (2) the humidity conditions were not maintained at 50%. The samples were measured at ambient temperature and relative humidity. Density values were rounded to the nearest milligram.

Example 1

Cellulose propionate pellets, approximately 3 mm diameter (10 grams, medium molecular weight, MFI=329° F., Aldrich Chemical Co.) were placed in a 300 cm³ autoclave which was charged with ethylene ($C_2H_4$) gas. The autoclave was placed in an oil bath to bring the system up to the processing temperature of 165° C. As the system was reaching thermal equilibrium, additional $C_2H_4$ was added such that the final pressure stabilized at 31 MPa (4,500 psig). The pellets were allowed to saturate with the SCF at this condition for 50 minutes before rapidly venting to atmospheric pressure. The recovered pellets had a density of 50 mg.cm$^{-3}$. Examination of the pellets fractured in liquid nitrogen indicated substantially uniform cell structure with cell diameters of 80 to 120 µm.

Example 2

Polyethylene fibers about 25 µm in diameter were placed in an autoclave. Ethylene was added to bring the final pressure to 31 MPa (4,500 psig) at 109° C. The fibers were held at this temperature and pressure for 15 minutes before rapid venting. Fiber density was 590 mg.cm$^{-3}$ with 7 to 10 µm diameter cells.

Example 3

Cellulose triacetate pellets (10 grams, Aldrich Chemical Co.) were exposed to carbon dioxide at 220° C. at 31 MPa (4,500 psig). Exposure time from first charging the autoclave to the final vent down was 55 minutes. The foamed pellets had a density of 300 mg.cm$^{-3}$.

Example 4

Polyurethane film was foamed to a density of 300 mg.cm$^{-3}$ by exposing the polymer to ethylene at 175° C. for a total saturation time of 113 minutes. The autoclave was rapidly vented down to atmospheric pressure from 31 MPa (4,500 psig).

Example 5

Polystyrene pellets (5 grams, Aldrich Chemical Co.) were exposed to 34 MPa (5,000 psig) of ethylene at 110° C. for 100 minutes before venting the system rapidly. Analysis showed the cells to have an average diameter of 25 µm. The density of the pellets was 78 mg.cm$^{-3}$.

Example 6

Polymethylmethacrylate ("Perspex"-ICI) one-half disk, was placed in an autoclave and stabilized at 165° C. as the pressure was adjusted to 105 MPa (15,300 psig) with methane. The polymethylmethacrylate disk was saturated at these conditions for 120 minutes before rapidly venting off the methane. The recovered material was a white colored foam, which was significantly larger in size that the starting disk. The density of the white colored foam was 40 mg.cm$^{-3}$. Analysis of a liquid nitrogen fractured sample indicated the cell diameters were in the range of 20–40 μm.

Example 7

Polymethylmethacrylate powder (ICI) was blended with 40 wt % methyl methacrylate monomer containing 60 wt % of 0.5 μm tungsten metal powder until a slurry was obtained. This blend was poured into small tubes (6.3 mm diameter). The tubes were cured overnight at 45° C. in an atmosphere of nitrogen at a pressure of 1.38 MPa (200 psig) to produce polymer rods. The polymer rods were placed in an autoclave and exposed to ethylene at 115° C. and 41 MPa (6,000 psig) for 2 hours. Rapid vent down yielded a metal-filled foamed rod having a density of 231 mg.cm$^{-3}$.

Example 8

A polycarbonate piece measuring 76×12.7×6.3 mm (3"×½"×¼") was placed in an autoclave and foamed to low density by exposure of the piece to carbon dioxide at 185° C. and a pressure of 14 MPa (2,100 psig) for a period of about 120 minutes before a rapid vent down. The resultant foam had a density of 140 mg.cm$^{-3}$ and cell diameters in the range of 40 to 50 μm as determined by analyzing a liquid nitrogen fractured sample.

Example 9

A sample of polyetherimide (GE Ultem 1000) measuring 127×6.3×9.5 mm (5'×¼"×⅜") was foamed to low density by exposing the polymer to carbon dioxide for 4 hours at 230° C. The system pressure prior to vent down was 34.5 MPa (5,000 psig). The foamed material had a density of 293 mg.cm$^{-3}$. Analysis of a liquid nitrogen fractured sample indicated uniform cells throughout the sample having cell diameters in the range of 10 to 15 μm.

Example 10

This example demonstrates how polymers that contain additional foreign agents such as plasticizers, which may ordinarily be soluble in the SCF may be retained under the process of this invention, instead of being extracted during the foaming process.

Plasticized polyvinylchloride (Tygon™ tubing) was foamed without significant reduction in plasticizer content using an underwater technique. A 4.7 gram section of Tygon™ tubing was foamed by immersing the tubing in water while in an autoclave. The autoclave was then charged with ethylene and stabilized at 41.4 MPa (6,000 psig) at 130° C. to saturate the tubing with the supercritical ethylene. After rapid pressure release, the material foamed to a density of 477 mg.cm$^{-3}$. The tubing remained soft and flexible because the plasticizer content was not significantly reduced based on gravimetric analysis.

Example 11

Semi-crystalline low viscosity polyetheretherketone (ICI "Victrex 150G") was foamed to a density of 800 mg.cm$^{-3}$ by exposure to supercritical carbon dioxide at 260° C. and 34.5 MPa (5,000 psig) for (4.5 hrs.).

Example 12

Linear low density polyethylene (Dow Chemical "Aspen 6806", MFI 180° C.) (10 grams) was melt blended with 0.5 gram of glass wool to form a uniform dispersion in the polyethylene. Several pieces of this material was placed in an autoclave and the system was charged with ethylene. After about 4 hours the system stabilized at 31.0 MPa (4,500 psig) at 114° C. A foamed article having a density of 420 mg.cm$^{-3}$ was recovered.

Example 13

Acrylonitrile/butadiene/styrene resin (ABS) was exposed to carbon dioxide at 40° C. and 13.8 MPa (2,000 psig) pressure for 18 hours. The density of the foamed material was 880 mg.cm$^{-3}$.

Example 14

A polymer blend of polybutylene and polypropylene film was exposed to ethylene at 33.1 MPa (4,800 psig) and 123° C. The polymer blend was saturated for about 70 minutes before a rapid vent down to yield a material having a density of 562 mg.cm$^{-3}$.

Example 15–26

Table 1 summarizes various additional examples that exemplify the capability of the SCF foaming process to produce thermoplastics of variable density and cell size. The following notations identify the polymers summarized in Table 1.

(a) polyethylene:tetrafluoroethylene (50/50 DuPont)

(b) cellulose propionate (MW: 200,000)

(c) polystyrene (Dow Chemical)

(d) polystyrene (MW:<400,000)

(e) polymethylmethacrylate (ICI "Perspex" MW: 4–6× $10^6$)

(f) linear low density polyethylene (Dow "Aspen")

(g) polyurethane

TABLE 1

| Example | Polymer | Form | SCF | Temp (°C.) | Pressure (MPa) | Time (min.) | Density (mg · cm$^{-3}$) | Cell Diameter (μm) |
|---|---|---|---|---|---|---|---|---|
| 15 | Tefzel$^a$ | bead | $CO_2$ | 115 | 30 | 30 | 350 | — |
| 16 | Cell. P$^b$ | bead | $CO_2$ | 165 | 56 | 30 | 200 | 10 |
| 17 | Styron$^c$ | bead | $C_2H_4$ | 130 | 41 | 30 | 35 | 30–40 |
| 18 | Styron | bead | $C_2H_4$ | 100 | 41 | 30 | 172 | 15 |
| 19 | Styron | bead | $CH_4$ | 135 | 96 | 30 | 58 | 15–20 |
| 20 | Styron | bead | $CH_4$ | 130 | 83 | 40 | 67 | 5–10 |
| 21 | PS$^d$ | bead | $C_2H_4$ | 140 | 41 | 40 | 460 | — |
| 22 | PMMA$^e$ | disk | $CO_2$ | 160 | 42 | 80 | 72 | 10–30 |

TABLE 1-continued

| Example | Polymer | Form | SCF | Temp (°C.) | Pressure (MPa) | Time (min.) | Density (mg · cm$^{-3}$) | Cell Diameter (μm) |
|---|---|---|---|---|---|---|---|---|
| 23 | PMMA | 12.7 × 3.2 m rod | N$_2$O | 135 | 39 | 120 | 127 | 127 |
| 24 | LLDPE$^f$ | bead | C$_2$H$_6$ | 116 | 32 | 120 | 240 | 15–25 |
| 25 | PU$^g$ | film | C$_2$H$_4$ | 150 | 48 | 120 | 250 | 15–20 |
| 26 | PU | film | C$_2$H$_4$ | 150 | 62 | 120 | 291 | 5–10 |

Example 27–78

The following general method was used for the following examples. Particular deviations or variations are specifically identified as necessary. The materials and operating conditions for various thermoplastics are tabulated in Tables 2–9. Saturation times were varied, however once the thermoplastic has been fully saturated, additional saturation time did not affect the resulting foamed article.

General Foaming Process

A thermoplastic polymer sample is placed in a high pressure steel or stainless steel vessel and the vessel is sealed. The vessel is then completely immersed in an oil bath set at a predetermined temperature. The oil temperature is monitored and controlled via a thermocouple placed in the oil, and the pressure is monitored by a pressure transducer connected to the vessel.

During thermal equilibration, the fluid (either as a gas or as a supercritical fluid) is transferred via a compressor or pump attached to the pressure vessel and adjusted until the requisite pressure is attained.

The thermoplastic polymer is exposed to the supercritical fluid for a period of time necessary to completely or partially saturate the thermoplastic polymer.

After the sample has been saturated for an appropriate period of time, the pressure vessel is opened by means of a remote control vent, which allows the internal pressure to come to atmospheric pressure within a few seconds. The vessel is immediately disconnected and placed in a water bath for cooling before opening the vessel and recovering the foamed thermoplastic polymer.

Examples 27–32

Linear low density polyethylene was foamed using the general foaming process using ethylene (Examples 27–29) and ethane (Examples 30–32) as the supercritical fluids. After the pressure vessel was charged to approximately half of the desired final pressure. The temperature was allowed to stabilize for 20 minutes. The vessel was then pressurized to the final desired pressure. The system remained in the oil bath for an additional ½ hours before rapidly venting the pressure vessel over a period of 1 to 3 seconds to atmospheric pressure. All the samples were in the form of beads.

TABLE 2

| Example | Amount | Pressure (MPa) | Temp (°C.) | Saturation Time (hr.) | Density (mg · cm$^3$) |
|---|---|---|---|---|---|
| 27 | 5 grams | 31 | 111 | 1 | NA |
| 28 | 5 grams | 32 | 120 | 0.5 | NA |
| 29 | 5 grams | 32 | 114 | 0.6 | 240 |

TABLE 2-continued

| Example | Amount | Pressure (MPa) | Temp (°C.) | Saturation Time (hr.) | Density (mg · cm$^3$) |
|---|---|---|---|---|---|
| 30 | 7 grams | 32 | 120 | 0.5 | 276 |
| 31 | 7 grams | 34 | 130 | 0.75 | 227 |
| 32 | 7 grams | 34 | 125 | 0.6 | 196 |

Examples 33–36

Polyurethane samples was foamed using the general foaming process using ethylene as the supercritical fluid. The polyurethane sheet was 0.8 mm thick.

TABLE 3

| Example | Amount | Pressure (MPa) | Temp (°C.) | Saturation Time (min.) | Density (mg · cm$^3$) |
|---|---|---|---|---|---|
| 33 | 76 × 127 mm | 31 | 120 | 3 | 1.03 |
| 34 | 102 × 127 mm | 31 | 135 | 10 | 0.71 |
| 35 | 127 × 127 mm | 30 | 150 | 5 | 0.57 |
| 36 | 76 × 76 mm | 30 | 171–175 | 3 | 0.3 |

Examples 37–40

Polycarbonate samples was foamed using the general foaming process using carbon dioxide as the supercritical fluid. Pressure variations of 1.5 MPa do not effect the density of the resulting foam.

TABLE 4

| Example | Amount/Form (mm) | Pressure (MPa) | Temp (°C.) | Saturation Time (hr.) | Density (mg · cm$^3$) |
|---|---|---|---|---|---|
| 37 | 6.8 × 12.7 × 108 | 12 | 190 | 2 | 694 |
| 38 | 6.3 × 12.7 × 102 | 12 | 175 | 2 | 345 |
| 39 | 6.3 × 12.7 × 102 | 14 | 175 | 1.6 | 132 |
| 40 | 19 × 6.3 × 108 | 14 | 165 | 1.25 | 160 |

Examples 41–44

High density polyethylene (HDPE) samples were foamed using the general foaming process using carbon dioxide as the supercritical fluid. The HDPE was wrapped in a fibrous glass insulation material and place in a sample holder and then placed in the pressure vessel. The pressure vessel was placed in the oil bath and equilibrated at the run conditions. After a predetermined period of time (saturation time) at run conditions, the vessel was rapidly vented over a period of about 10 seconds.

TABLE 5

| Example | Amount/Form (mm) | Pressure (MPa) | Temp (°C.) | Saturation Time (hr.) | Density (mg · cm³) |
|---|---|---|---|---|---|
| 41 | 64 × 22 × 4.8 | 19 | 127 | 3.5 | 374 |
| 42 | 64 × 22 × 4.8 | 21 | 127 | 2.5 | 56 |
| 43 | 64 × 22 × 4.8 | 28 | 127 | 4 | NA |
| 44 | 60 × 25 × 4.8 | 25 | 128 | 2 | 172 |

Examples 45–53

Polyetherimide samples (commercially available from General Electric under the trade designation ULTEM) were foamed using the general foaming process using carbon dioxide as the supercritical fluid. The samples are summarized in Table 6. All the samples were 6.8×6.3×3.2 mm and were saturated for a period of 4 hours.

TABLE 6

| Example | Pressure (MPa) | Temp (°C.) | Density (mg · cm³) |
|---|---|---|---|
| 45 | 14 | 216 | 574 |
| 46 | 28 | 216 | 466 |
| 47 | 41 | 216 | 531 |
| 48 | 14 | 220 | 372 |
| 49 | 28 | 220 | 249 |
| 50 | 41 | 220 | 315 |
| 51 | 14 | 230 | 666 |
| 52 | 28 | 230 | 475 |
| 53 | 41 | 230 | 283 |

Examples 54–56

Polyetherimde samples (commercially available from General Electric under the trade designation ULTEM) was foamed using the general foaming process using carbon dioxide as the supercritical fluid. The polymer samples were wrapped with glass insulation and placed in a rectangular stainless steel holder. To a pressure vessel (7.6 liters) was added the methylene chloride along with the pelyetherimide samples. The vessel was closed and mounted in a stand and adjusted to process conditions of the run by adding the carbon dioxide. The pressure was adjusted using the carbon dioxide. The vessel was electrically heated. The samples remained at temperature for 17 hours before rapid release of pressure over a 60 second interval. Methylene chloride may be used together with the carbon dioxide to assist in the solvation of the polyetherimide to aid in achieving additional density reductions over the carbon dioxide alone. Samples are summarized in Table 7. For all the examples, the pressure was 31 MPa, the temperature was 240° C. and the saturation time was 4 hours.

TABLE 7

| Example | Amount (mm) | Density (mg · cm³) |
|---|---|---|
| 54 | 76 × 76 × 4.8 plus 302 cm³ CH$_2$Cl$_2$ | 105 |
| 55 | 51 × 51 × 6.3 plus 378 cm³ CH$_2$Cl$_2$ | 122 |
| 56 | 51 × 51 × 6.3 plus 200 cm³ CH$_2$Cl$_2$ | 112 |

Examples 57–64

Polystyrene samples were foamed using the general foaming process using carbon dioxide as the supercritical fluid. The samples are summarized in Table 8.

TABLE 8

| Example | Amount/Form | Pressure (MPa) | Temp (°C.) | Saturation Time (hr.) | Density (mg · cm³) |
|---|---|---|---|---|---|
| 57 | 6 grams beads | 21 | 115 | 1.5 | 83 |
| 58 | 3 grams beads | 15 | 115 | 1.5 | 50 |
| 59 | 1.7 grams beads | 19 | 111 | 2 | 128 |
| 60 | 2 grams beads | 34 | 111 | 1.5 | 227 |
| 61 | 2 grams beads | 14 | 111 | 2.5 | 116 |
| 62 | 2 grams beads | 14 | 118 | 2.25 | 35 |
| 63 | 1.2 grams beads | 21 | 118 | 2.3 | 55 |
| 64 | 1.2 grams beads | 35 | 118 | 2 | 168 |

Examples 65–77

Polystyrene samples were foamed using the general foaming process using carbon dioxide as the supercritical fluid. The samples are summarized in Table 9. For each example only one bead was foamed.

TABLE 9

| Example | Pressure (MPa) | Temp (°C.) | Cell Diameter (μm) | Saturation Time (hr.) |
|---|---|---|---|---|
| 65 | 14 | 111 | 75 | 1 |
| 66 | 21 | 111 | 50 | 1 |
| 67 | 34 | 111 | 35 | 1 |
| 68 | 15 | 115 | 80 | 1 |
| 69 | 34 | 115 | 25 | 1 |
| 70 | 15 | 118 | 100 | 1 |
| 71 | 21 | 118 | 75 | 2 |
| 72 | 28 | 111 | 40 | 2 |
| 73 | 28 | 118 | NA | 1.75 |
| 74 | 14 | 122 | 125 | 1.5 |
| 75 | 21 | 122 | 100 | 1 |
| 76 | 28 | 122 | 50 | 1 |
| 77 | 34 | 122 | 40 | 1.25 |

Examples 78–80

Figure 10A:
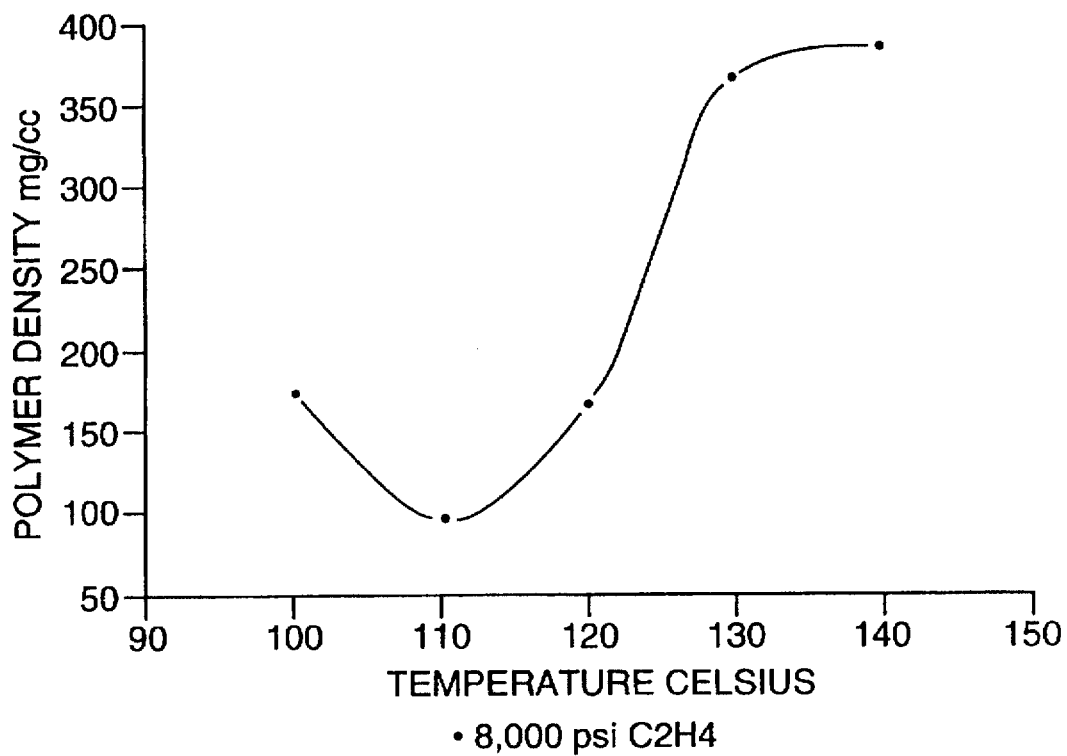
FIG. 10A is a graphical representation of polymer density (mg/cc) vs temperature (°C.) for polystyrene.
Figure 10B:
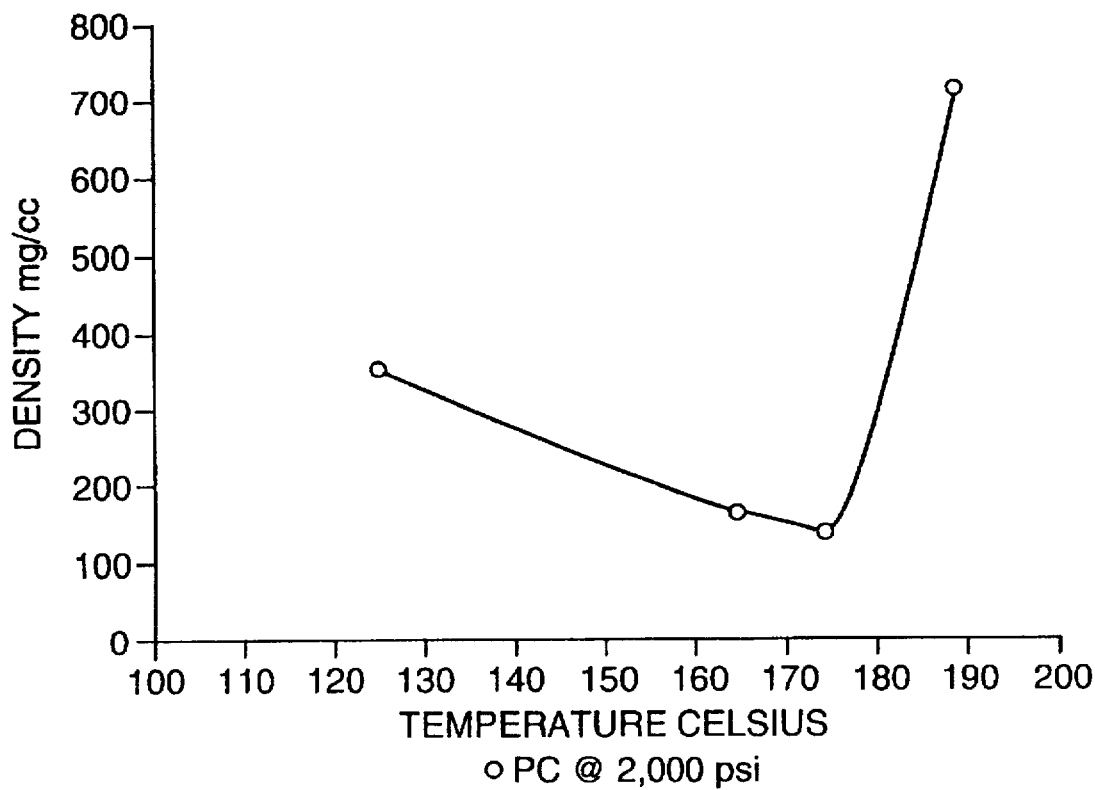
FIG. 10B is a graphical representation of polymer density (mg/cc) vs temperature (°C.) for poly carbonate.
Figure 11:
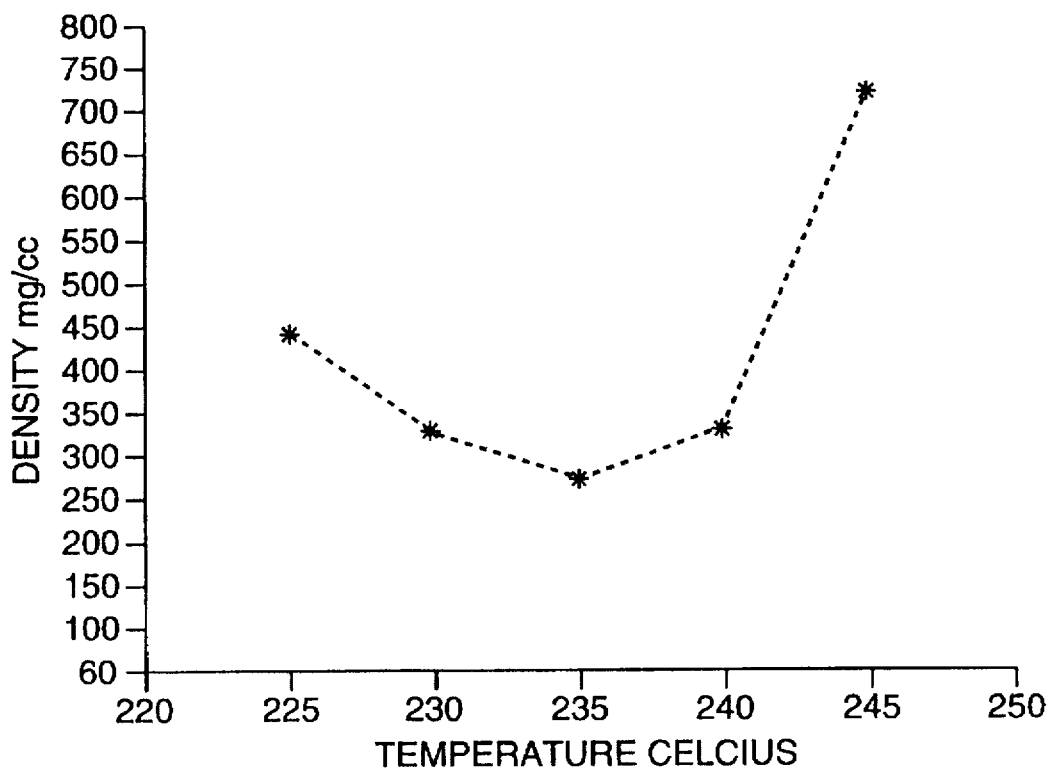
FIG. 11 is a graphical representation of polymer density (mg/cc) vs temperature (°C.) for Ultem polyetherimide.

The following are provided as exemplification of the disclosed process. Ultem 1000® (Vicat softening temperature=219° C., General Electric Co.) was foamed in the manner described above using a fixed pressure of 4500 psi. An initial process temperature of 235° C. was selected. Four additional runs, two above and two below the initial temperature, were also conducted at 5° C. increments, giving a total of five points (225°–245° C.). These were plotted (see FIG. 11) and found to give a U-shaped curve with a minimum density at the initial temperature of 235° C., at this pressure. The point of minimum density will change as the pressure is varied, thus shifting the curve up or down. This procedure is a general one, as shown by the additional plots for poly(styrene) FIG. 10A (Vicat softening temperature=100° C.) and poly(carbonate) (Vicar softening temperature=154° C.).

Example 81

Figure 12:
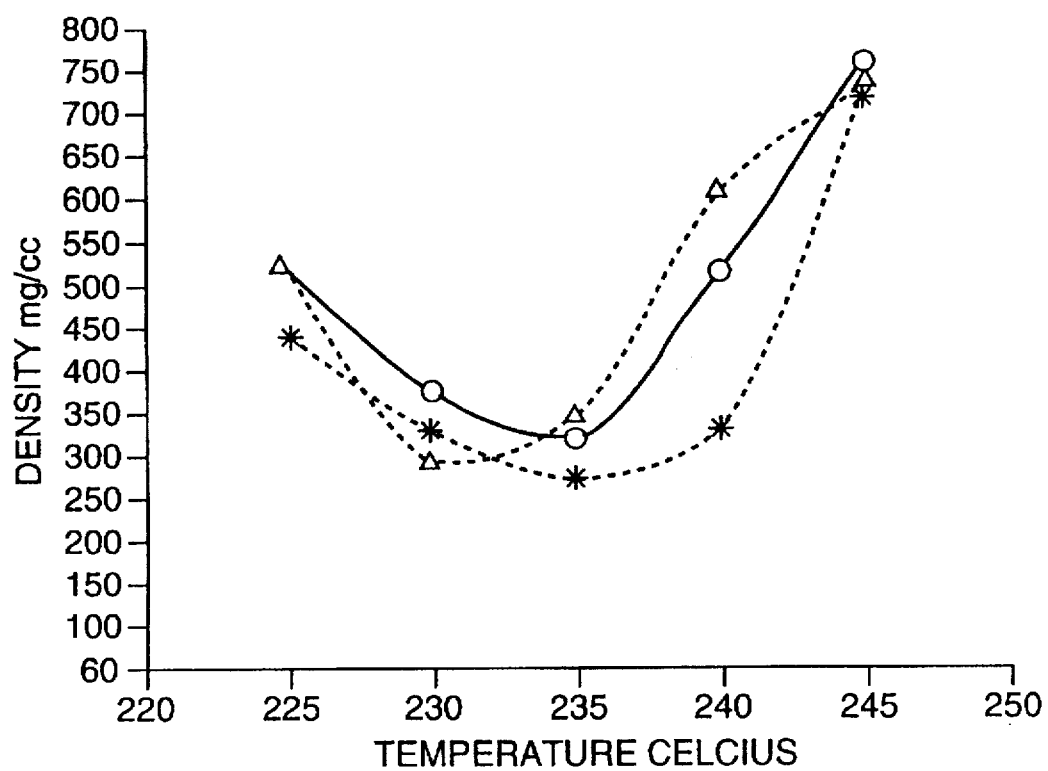
FIG. 12 is a graphical representation of polymer density (mg/cc) vs temperature (°C.) for Ultem polyetherimide as 3 different molecular weights.

Ultem™ polyetherimide of various molecular weights were processed as described in Examples 78–80 using a fixed pressure of 4500 psi and a temperature range of 225° to 245° C. As can be seen from the curves obtained, shown in FIG. 12, the point of minimum density is shifted to higher temperatures as the molecular weight (melt index) of the initial polymer is increased.

Another example is poly(methyl methacrylate)=PMMA. At a low molecular weight (MW of $1\times10^6$), PMMA may be foamed at 135° C. and 41 MPa (6000 psig); but at a higher molecular weight (MW>$4\times10^6$) it may require a higher temperature, such as 165° C., at the same pressure.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A process for producing low density cellular foamed thermoplastic articles comprising the steps:
   (1) charging a pressure vessel with a solid thermoplastic polymer;
   (2) heating the pressure vessel containing the solid thermoplastic polymer to a predetermined saturation temperature using an external heat source, heated to a temperature at or near the Vicat softening point of the solid thermoplastic polymer;
   (3) simultaneously charging a gas, while heating the pressure vessel;
   (4) equilibrating the pressure vessel, the solid thermoplastic polymer, and the gas at or near the Vicat softening point the external heat source;
   (5) adjusting the pressure in the pressure vessel by adding additional gas to achieve a final pressure wherein the gas is a supercritical fluid and soluble in the solid thermoplastic polymer;
   (6) saturating the solid thermoplastic polymer with the supercritical fluid for a predetermined period of time; and
   (7) venting the pressure vessel to rapidly depressurize the pressure vessel to foam the solid thermoplastic polymer.

2. The process according to claim 1 wherein the thermoplastic polymer has a glass transition temperature above 150° C.

3. The process according to claim 1 wherein the thermoplastic polymer has a glass transition temperature below 150° C.

4. The process according to claim 1 wherein the thermoplastic is polyetherimide.

5. The process according to claim 1 wherein the gas is carbon dioxide, nitrous oxide, ethylene, ethane, tetrafluoroethylene, perfluoroethane, tetrafluoromethane, trifluoromethane, or 1,1-difluoroethylene.

6. The process according to claim 1 further includes charging the pressure vessel with one or more of solvents, emulsifiers, fillers, hollow particles, reinforcements, colorants, coupling agents, antioxidants, antistatic compounds, flame retardants, heat stabilizers, lubricants, mold release agents, plasticizers, preservatives, or ultraviolet stabilizers.

7. The process according to claim 6 wherein a solvent is methylene chloride.

8. A process for producing low density cellular foamed thermoplastic articles comprising the steps:
   (1) charging a pressure vessel with a solid thermoplastic polymer;
   (2) charging the pressure vessel with an additive;
   (3) heating the pressure vessel containing the solid thermoplastic polymer to a predetermined saturation temperature using an external heat source, heated to a temperature at or near the Vicat softening point of the solid thermoplastic polymer;
   (4) simultaneously charging a gas, while heating the pressure vessel;
   (5) equilibrating the pressure vessel, the solid thermoplastic polymer, and the additive, and the gas at or near the Vicat softening point by the external heat source;
   (6) adjusting the pressure in the pressure vessel by adding additional gas to achieve a final pressure wherein the gas is a supercritical fluid and soluble in the solid thermoplastic polymer;
   (7) saturating the solid thermoplastic polymer with the supercritical fluid for a predetermined period of time; and
   (8) venting the pressure vessel to rapidly depressurize the pressure vessel.

9. The process according to claim 8 wherein the thermoplastic polymer has a glass transition temperature above 150° C.

10. The process according to claim 8 wherein the thermoplastic polymer has a glass transition temperature below 150° C.

11. The process according to claim 9 wherein the thermoplastic is polyetherimide.

12. The process according to claim 8 wherein the gas is carbon dioxide, nitrous oxide, ethylene, ethane, tetrafluoroethylene, perfluoroethane, tetrafluoromethane, trifluoromethane, or 1,1-difluoroethylene.

13. The process according to claim 8 wherein the additive is a solvent.

14. The process according to claim 8 wherein the solvent is methylene chloride.

* * * * *

UNITED STATES PATENT AND TRADEMARK OFFICE
CERTIFICATE OF CORRECTION

PATENT NO.: 5,670,102

DATED: September 23, 1997

INVENTOR(S): Craig A. Perman, William A. Hendrickson, and Manfred E. Riechert

It is certified that error appears in the above-identified patent and that said Letters Patent is hereby corrected as shown below:

Col. 2, Line 31 "presses" should read -- processes --

Col. 4, Line 32 "$\geqq$" should read -- $\geq$ --

Col. 8, Line 51 "non flammable" should read -- nonflammable --

Col. 13, Line 35 "5'" should read -- 5" --

Col. 17, Line 33 "Polyetherimde" should read -- Polyetherimide --

Col. 17, Line 39 "pelyetherimide" should read -- polyetherimide --

Col. 19, Line 30 "point the" should read -- point by the --

Col. 20, Line 50 "8" should read -- 13 --

Figure 9:
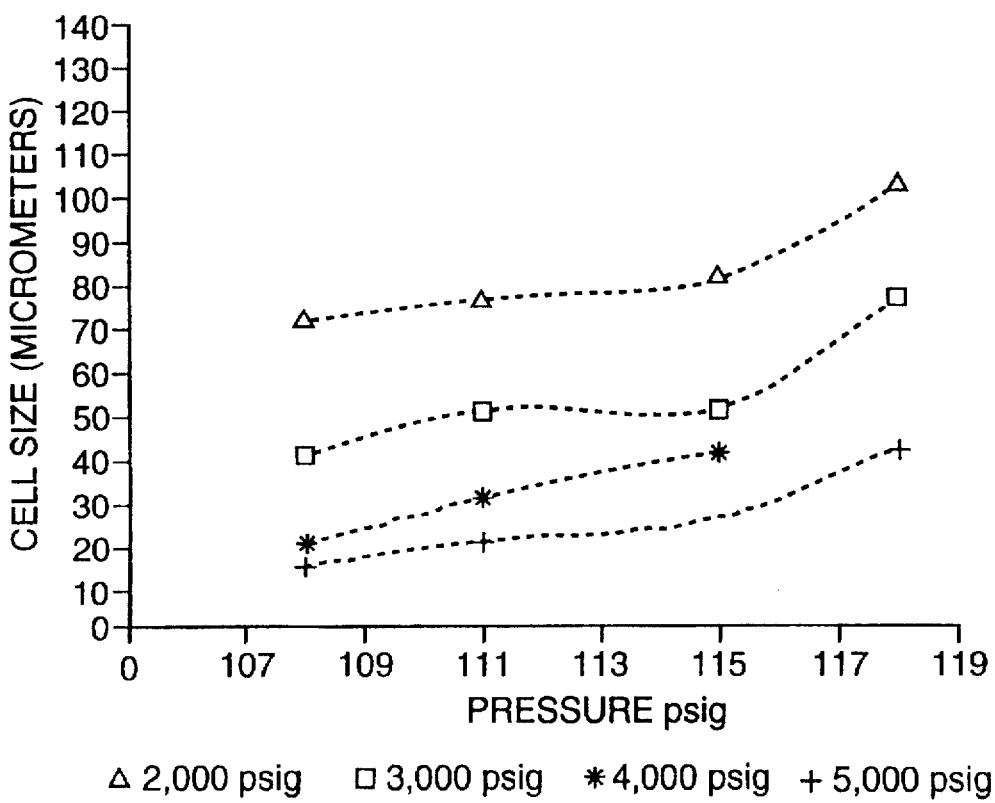
FIG. 9 is a graphical representation of cell size (micrometers) vs temperature (°C.) for polystyrene at 4 different pressures.

Figure 9, the abscissa title "PRESSURE psig" should read -- TEMPERATURE CELSIUS --

Signed and Sealed this

Thirtieth Day of June, 1998

Attest:

BRUCE LEHMAN

Attesting Officer

Commissioner of Patents and Trademarks